A. & W. BRUHN.
CHICKEN EXERCISING FEEDER.
APPLICATION FILED MAR. 28, 1907.
902,132.
Patented Oct. 27, 1908.
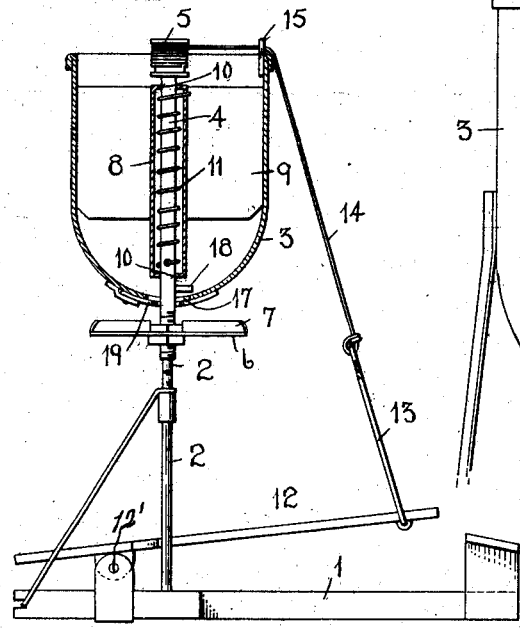
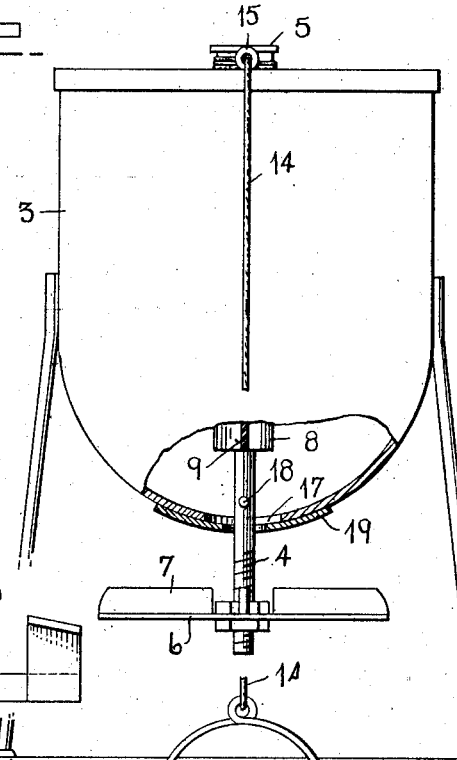
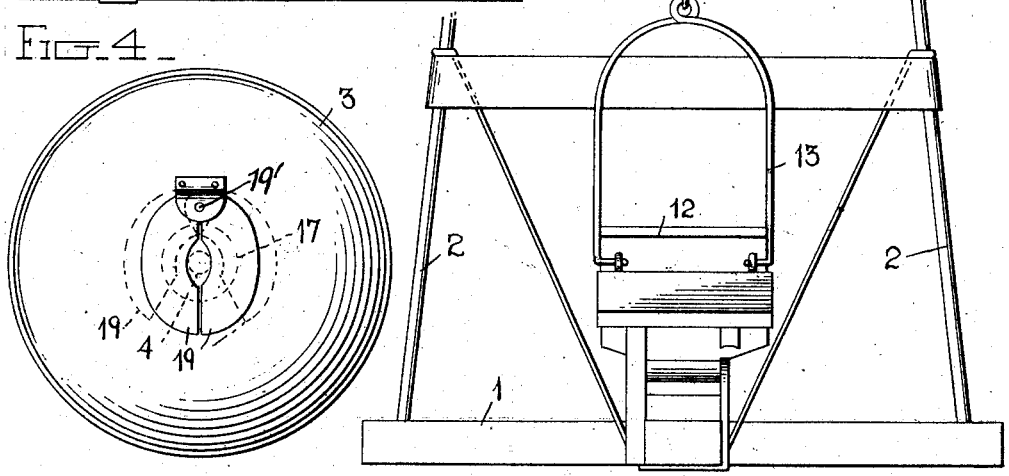
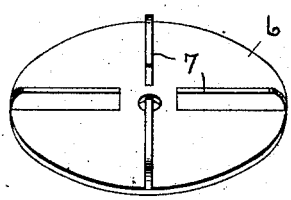
Inventor
A. BRUHN
W. BRUHN

UNITED STATES PATENT OFFICE.

ALBERT BRUHN AND WILLIAM BRUHN, OF ST. BONIFACIUS, MINNESOTA.

CHICKEN-EXERCISING FEEDER.

No. 902,132.  Specification of Letters Patent.  Patented Oct. 27, 1908.

Application filed March 28, 1907. Serial No. 365,003.

*To all whom it may concern:*

Be it known that we, ALBERT BRUHN and WILLIAM BRUHN, citizens of the United States, residing at St. Bonifacius, in the county of Hennepin and State of Minnesota, have invented certain new and useful Improvements in Chicken-Exercising Feeders; and we do declare the following to be a full, clear, and exact description of the invention, such as will enable others skilled in the art to which it appertains to make and use the same.

This invention relates to automatic feeders, and more particularly to an apparatus for feeding and exercising poultry, and it has for its object to provide a device of this kind by which the fowl being fed actuates the feeding mechanism by its weight and scatters the feed to such an extent that in going to pick up the feed the fowl is compelled to take the necessary exercise, which will prevent it from becoming so fat and lazy that egg laying is interfered with.

In the accompanying drawings, which illustrate the invention,—Figure 1 is a broken side elevation of the machine as it appears in use; Fig. 2 is a front elevation of the same, the upper portion being shown in cross section; Fig. 3 is a perspective view of the distributer; and Fig. 4 is a bottom plan view of the hopper, showing the means for adjusting the feed.

Referring more particularly to the drawings, 1 indicates a base, which may be of any suitable size and dimensions, the structure shown in the drawings being preferably cruciform, on which is mounted, as by means of standards 2, a suitable hopper 3.

Rotatably mounted within the hopper is a shaft 4, with a spool 5 at its upper end and a distributer 6 at the lower end, the distributer being preferably provided with radially arranged wings 7. The distributer preferably consists of a flat disk, which can be adjustably mounted upon the lower end of the shaft, as by means of screw-threads and nuts above and below the disk.

The shaft is preferably inclosed in a vertically arranged cylindrical casing 8, which is secured vertically within the hopper by radially arranged arms or brackets 9. The casing 8 is of a greater diameter than the shaft 4, and has its ends provided with centrally perforated pieces 10, and a coiled spring 11 is seated within the casing so as to encircle the shaft with one end in engagement therewith, and the other end in engagement with the casing.

A lever or platform 12 is pivotally mounted at 12' upon the base 1 with its free end provided with a bail 13 which is connected with the pulley 5 by means of a cord 14, which passes over a pulley 15 near the top of the casing, and is wound upon the spool or pulley 5, so as to rotate the same against the tension of the spring whenever the free end of the lever is depressed, and thereby cause the shaft and distributer to be rotated with considerable velocity.

The lever is adapted to be actuated or depressed at its free end by the weight of the fowl, and to secure a sufficient depression to rotate the shaft and spreader the desired number of times, the free end of the lever is adapted to be held so far above the base 1 that a step 16 is necessary to permit of the fowl stepping from the ground on to the step and then on to the lever.

The lower end of the hopper is provided with an opening 17, through which the contents can readily pass on to the distributer so as to be thrown horizontally in all directions where the distributer is rotated by the weight of the fowl on the lever. A pin or projection 18 is secured to the shaft at a slight distance above the opening 17, so as to agitate the feed within the hopper when the shaft is rotated, and thereby prevent its clogging or failure to pass through the opening 17. The size of the opening can be graduated or regulated in any desired manner, as by means of one or more gates 19, which are pivoted at one end as at 19' and project forward with their free ends in position to be swung toward or from the shaft by the attendant, and thereby control the size of the opening.

From practical experience with a machine as above described, we have found that the chicken or other fowl will soon learn that by stepping upon the lever, the food will be thrown off the distributer into a position where they can get at it, but at the same time, the feed will be thrown to such a distance that in gathering it up they must necessarily take the desired exercise to keep them in the best condition for laying eggs. As there is always more or less feed upon the top of the distributer, it will attract the attention of the fowl, and in their efforts to get at it, they will naturally step upon the lever, and thereby throw off the feed, and soon learn how to feed themselves without care or further attention from their owners. As soon as the fowl steps off the lever, the tension of the spring within the casing immediately restores it to its normal position, ready to be actuated by another fowl, the shaft and distributer being simply rotated in the reverse direction, which will also cause a further distribution of the feed.

The device is very simple, and by providing it with a suitable cover, it can be left exposed without serious detriment to its operation, and by keeping the hopper supplied with food, no further attention is necessary.

Having described our invention, we claim—

1. In an automatic feeder and exercising device, a hopper, a shaft journaled vertically therein, the lower end of which projects below the hopper and is provided with a horizontally arranged distributer, a spring around the shaft for rotating it in one direction, and means for rotating the shaft against the tension of the spring by the weight of a fowl.

2. In an automatic feeder and exercising device, a hopper, a shaft journaled vertically therein, the upper end of which is provided with a spool, and the lower end with a winged distributer, a spring around said shaft, a cord adapted to be wound around the spool, and means connected with said cord for actuating the shaft against the tension of the spring by the weight of a fowl.

3. In an automatic feeder and exercising device, a hopper, a casing therein, a shaft journaled in said casing, the upper end of which is provided with a spool and the lower end projects below the hopper, and is provided with a winged distributer, a coiled spring within the casing, one end of which is connected with the shaft and the other with the casing, a cord adapted to be wound upon the spool, and a tripping lever connected with the other end of the cord, whereby the lever will cause the shaft and distributer to be rotated in opposition to the spring.

4. In an automatic feeder and exercising device, a hopper provided with an opening in its lower end, regulating devices therefor, a shaft journaled in the hopper with its lower end extending through said opening, a winged disk on the lower end of the shaft below the opening, a pin projecting from the shaft above the opening, and means for rotating the shaft by the weight of a fowl.

5. In an automatic feeder and exercising device, a hopper provided with an opening in its lower end, two gates pivotally secured at one end to the hopper and having their free ends adapted to be moved from and toward each other, a shaft journaled vertically in the hopper, with its lower end projecting through said opening between said gates, a disk adjustably mounted on the lower end of the shaft and having its upper face provided with radially arranged wings, an agitator on the shaft above said opening, a spring for rotating the shaft in one direction, and means for rotating the shaft in the opposite direction by means of the weight of a fowl.

6. In an automatic feeder and exercising device, a base, a hopper mounted thereon provided with distributing mechanism, a lever pivotally mounted on the base, a bail connected with the free end thereof, a cord from the bail to the distributing mechanism, and a step adjacent to the free end of the lever.

7. In an automatic feeder and exercising device, a hopper, a shaft journaled vertically therein, the lower end of which projects below the hopper and is provided with a horizontally arranged distributer, a tension device around the shaft for rotating it in one direction and means for rotating the shaft against the action of the tension device by the weight of a fowl.

8. In an automatic feeder and exercising device, a hopper, a shaft journaled vertically therein, the upper end of which is provided with a spool, and the lower end with a winged distributer, a tension device around said shaft, a cord adapted to be wound around the spool, and means connected with said cord for actuating the shaft against the action of the tension device by the weight of a fowl.

In testimony whereof we have hereunto set our hands in presence of two subscribing witnesses.

ALBERT BRUHN.
WILLIAM BRUHN.

Witnesses:
M. H. HEGERLE,
J. V. HEGERLE.